United States Patent [19]

Frisbie et al.

[11] 4,225,031
[45] Sep. 30, 1980

[54] ARTICLE ORIENTATION DEVICE

[76] Inventors: Donald Frisbie, R.R.#2, Northfield, Minn. 55057; Larry D. Frisbie, Bricelyn, 56014; Joel J. Olson, 2836 Blackstone, St. Louis Park, Minn. 55416

[21] Appl. No.: 939,998

[22] Filed: Sep. 6, 1978

[51] Int. Cl.² ............... B65G 43/08; B65G 47/24
[52] U.S. Cl. .................... 198/395; 198/399; 198/410; 198/415; 198/416
[58] Field of Search ............... 198/382, 394, 395, 399, 198/400, 415, 416, 401, 410, 398

[56] References Cited

U.S. PATENT DOCUMENTS

| | | | |
|---|---|---|---|
| 971,999 | 10/1910 | Hodge | 198/400 |
| 1,866,605 | 7/1932 | Stewart | 198/399 X |
| 2,973,548 | 3/1961 | Walker | 198/757 X |
| 3,061,067 | 10/1962 | Liberty et al. | 198/382 |
| 3,224,554 | 12/1965 | Moulder et al. | 198/392 |
| 3,268,057 | 8/1966 | Ross et al. | 198/400 X |
| 3,289,808 | 12/1966 | Simmons | 198/395 |
| 3,338,373 | 8/1967 | Aidlin et al. | 198/399 X |
| 3,726,385 | 4/1973 | Sterling | 198/398 X |
| 3,874,498 | 4/1975 | Cover et al. | 198/399 |
| 3,967,724 | 7/1976 | Allen et al. | 198/395 |

FOREIGN PATENT DOCUMENTS 1276361  6/1972  United Kingdom ............... 198/400

Primary Examiner—James L. Rowland
Attorney, Agent, or Firm—James R. Cwayna

[57] ABSTRACT

A device for obtaining the proper end to end orientation of articles that are delivered to the device in a random orientation, the articles having a common longitudinal characteristic, the device including a rotating pick up and feed device for introduction of the articles to a first fee conveyor, an inspection device arranged to scan the article being carried therepast on the conveyor, a selector responsive to a signal from the inspection device and actuated in response thereto to shift the article into position for rotation, allow the same to continue its travel without rotation or to eject the article dependent upon the size of the article and a rotating wheel element to accomplish the rotation of the articles that are positioned for rotation by the selector and to propel and deliver such articles and those articles that do not require rotation to a final delivery conveyor.

11 Claims, 17 Drawing Figures

ARTICLE ORIENTATION DEVICE

FIELD OF THE INVENTION

This invention relates generally to article orientation devices wherein the articles are delivered in a random orientation to such device and are delivered therefrom in a properly oriented manner and in an end to end, inline relation.

BACKGROUND AND OBJECTS OF THE INVENTION

The requirement for proper orientation of articles in various processes is well known in the art. Various prior art devices accomplish such orientation but none of such devices provide the orientation in the manner as provided by the applicants' device particularly when the articles to be oriented cannot be subjected to treatments that may damage the exterior surfaces thereof.

The various prior art patents that have been considered include patents to Moulder, U.S. Pat. No. 3,224,554; Walker, U.S. Pat. No. 2,973,548; Ross, U.S. Pat. No. 3,268,057 Sterling, U.S. Pat. No. 3,726,385 and Liberty, U.S. Pat. No. 3,061,067.

The Moulder patent discloses a unit arranged to shift articles end for end but is not concerned with any specific orientation as the articles are of the same size and shape.

The Walker patent requires carrying elements having exposed upper fibers such that the same will impel the articles being carried.

The Ross patent relates to the orientation of tapered agricultural articles but relies on the article rolling down an inclined plane and the tapered surface will cause the article to roll to one side with the larger end being at the lowest portion of the plane when the roll is accomplished.

The Sterling and Liberty patents relate to articles which are of a common or constant diameter and to the orientation of oblong units.

Applicants' orientation device is disclosed herein as a device for orienting corn cobs such that they are all directed in a common direction for introduction into a kernel cutting device or the like. In order to properly operate such a device in plants that are provided with conveying devices and which utilize standard kernel cutting units, certain considerations exist in applicants' device to allow for the existing standards and equipment of such plants.

With the device provided by the applicants' means are not only provided to properly orient the cobs that are delivered thereto but also to select ears which are of at least a minimum and not over a maximum length. With the concepts provided in applicants' device the diameter of the ear may also be a controlling factor for ejection of an ear.

It is an object of applicants' invention to provide an article orienting device arranged to receive articles in random position and arrangement and to deliver the same in a common end to end and in line condition.

It is a further object of applicants' invention to provide an article orientation device including a sensing device to determine the orientation of articles delivered thereto and to thereafter provide means to selectively turn the articles that are in a reversed position to a proper position.

It is a further object of applicants' invention to provide an article orientation device which is adapted to receive articles from a conveying means and to deliver the same in singular fashion to a selective rotation device for rotation of those articles that are in what may be termed a reverse position.

It is a further object of applicants' invention to provide an article orientation device which includes means for sensing articles which are without a proper sizing limitation and to provide means for ejection of articles that are without such limits.

It is still a further object of applicants' invention to provide an article orientation device which provides a dual rotating wheel combination for either forwarding articles which are in proper relation without rotation or for rotating the articles that are in reversed position and thereafter forwarding the same.

It is yet a further object of applicants' invention to provide an article orientation device which, due to its particular design and construction, provides a means for carefully handling products such as agricultural products without damaging the same.

These and other objects and advantages of applicants' invention will more fully appear from the following disclosure made in connection with the accompanying drawings in which the same numeral or indicia is used to designate the same or similar parts throughout the several views, and in which.

Figure 1:
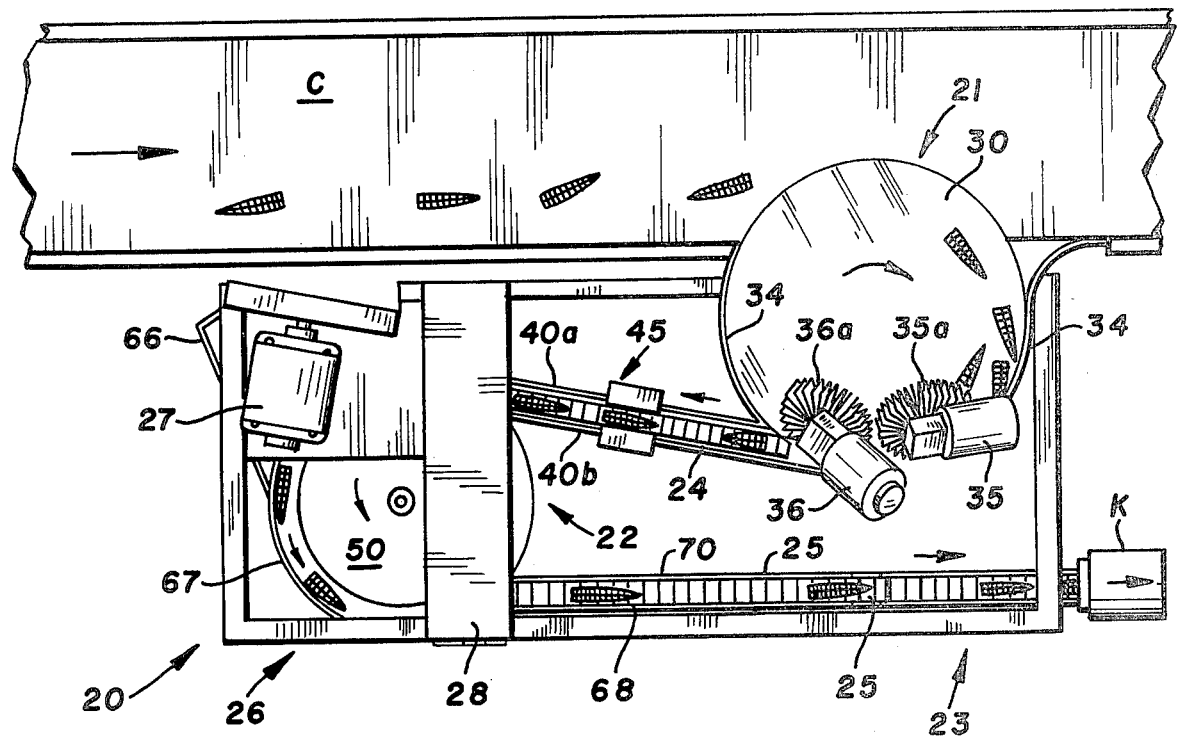
FIG. 1 is a top plan view of a corn ear orientation device embodying the concepts of applicants' invention and illustrating the same in operative position to receive ears of corn from a distribution belt and deliver the same to a kernel cutting unit.
Figure 2:
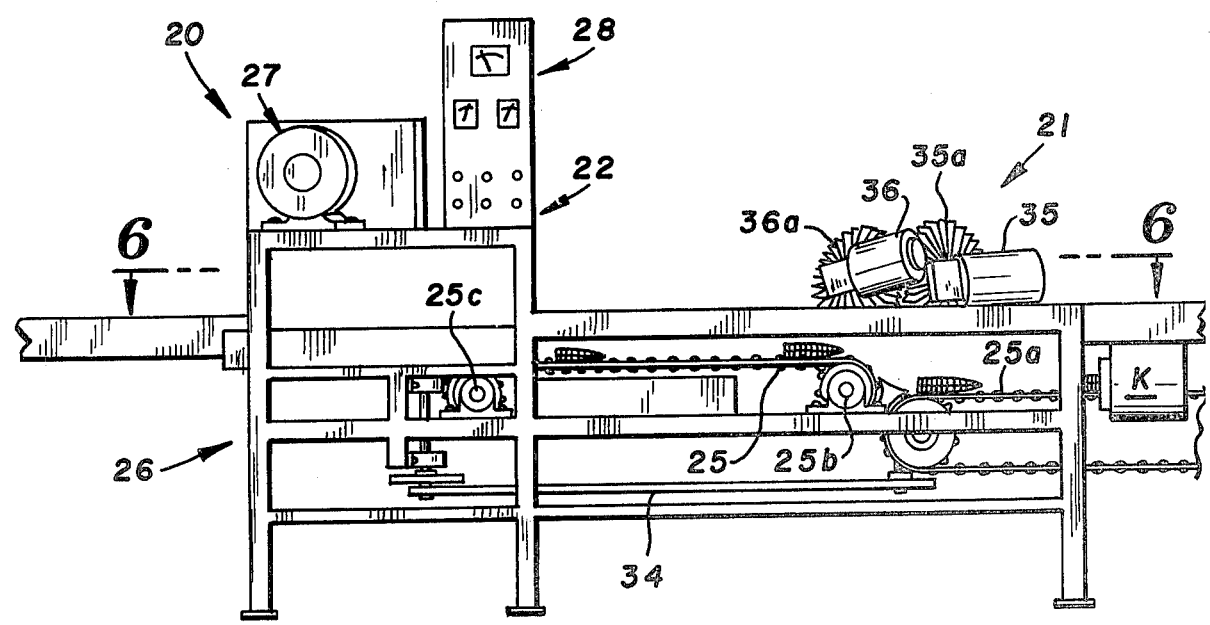
FIG. 2 is a side elevation of the device as illustrated in FIG. 1.
Figure 3:
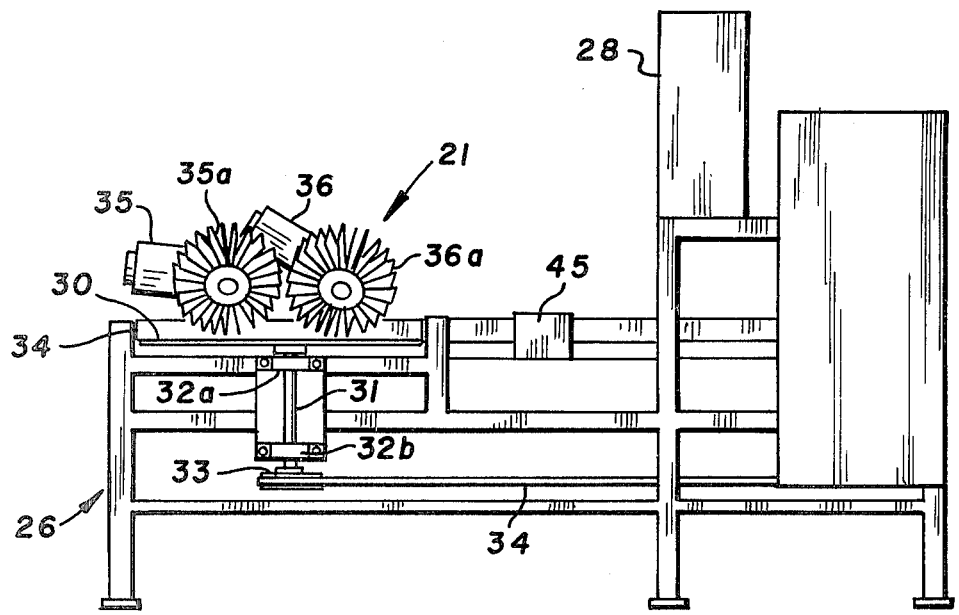
FIG. 3 is a side elevation of the device taken from the side opposite that illustrated in FIG. 2.

In accordance with the accompanying drawings, the orientation device embodying the concepts of applicants' invention is generally designated 20 and is illustrated in FIG. 1 in a typical operative position arranged to receive ears of corn from a conveyor C and deliver the same to a kernel cutter K or the like. The cutter K is designed to receive ears therein for the removal of the kernels from the ears only when the ears are all of a common or are within a selected range of diameters and when the ears are received with the smaller end thereof introduced forwardly, and applicants' device is arranged and constructed to orient the ears in such a manner.

Although the conveyor C illustrated is a belt conveyor, applicants' unit is capable of receiving ears from any type of delivery mechanism such as oscillators, bulk hoppers or the like.

Applicants' device for the purposes of description is most easily broken down into three basic elements or sections. These sections may be classified as an input or first delivery section 21, an orientation section 22 and a delivery or second delivery section 23. The input or first delivery section 21 and orientation section 22 is connected through a first conveyor element 24 and the delivery section 23 basically comprises a conveyor element 25. The orientation section 22, as will be explained, includes detection and rotation structures.

As illustrated in the various views, a frame 26 is provided and it should be obvious that this frame may take many shapes and forms with the prime concern for such frame being the positive mounting of the various elements of the device and maintaining them at an operative position and level for cooperation with the equipment to which they are associated.

Figure 4:
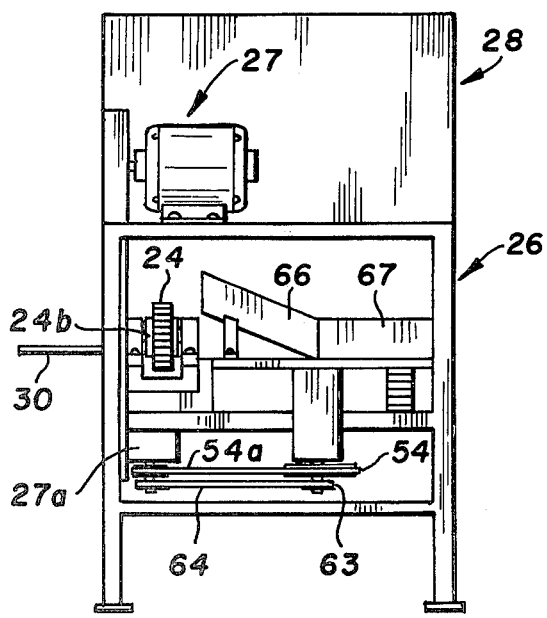
FIG. 4 is an end elevation of the device.
Figure 5:
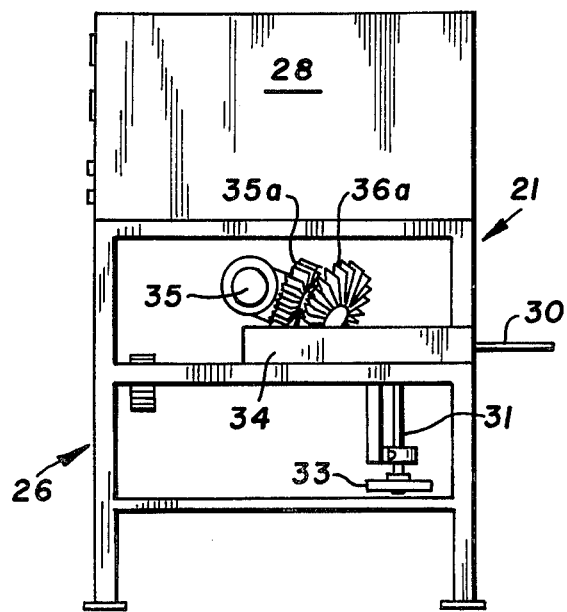
FIG. 5 is an end elevation of the device taken from the end opposite that illustrated in FIG. 4.
Figure 6:
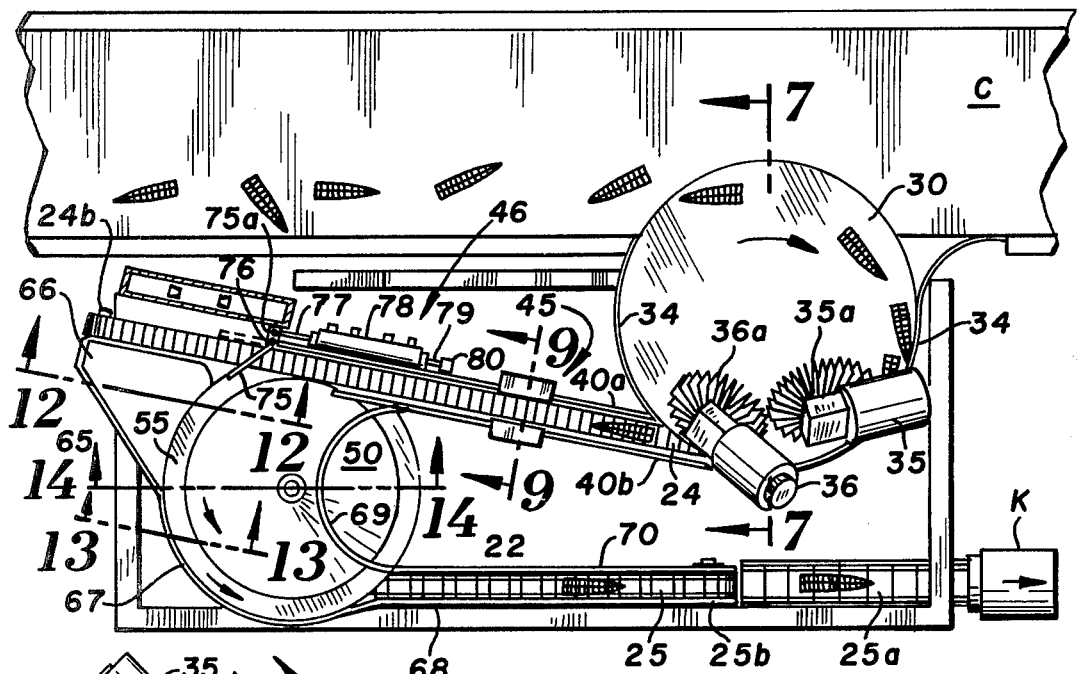
FIG. 6 is a horizontal section taken substantially along Line 6—6 of FIG. 2.

Mounted on the frame 26 at the upper portion thereof is a main drive motor 27 and a control panel and the associated controls 28 for the device. The drive motor 27 through a variety of pulleys and the like, provides the basic power for the orientation section 22 and the various conveyors 24, 25 and the input section 21. The basic power for delivery to these units is best illustrated in FIG. 4 wherein the motor 27 drives through a drive mechanism to a gear reducer box 27a or the like mounted at a lower portion of the frame and various other drive arrangements are taken therefrom. It will be obvious to those skilled in the art that various of the driving portions of the unit will require timing techniques and various drive transmission techniques and these are well within the skill of one skilled in the art.

Figure 7:
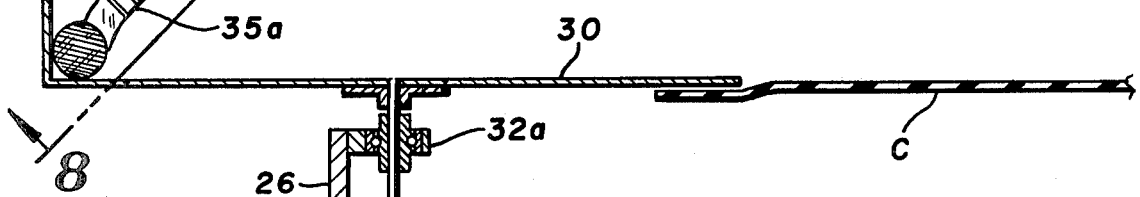
FIG. 7 is a vertical section taken substantially along Line 7—7 of FIG. 6.

The input or first delivery section 21 basically comprises a rotatable wheel or table member 30 having a drive shaft 31 arranged therebelow which drive shaft is carried by a pair of bearing members 32, 32b mounted on the frame 26 with a drive pulley 33 fixedly attached to the shaft 31 to provide rotation to the wheel or disc 30. As best illustrated in FIG. 7, this drive disc is mounted in overlying relationship to the distributor belt or the conveyor C such that articles such as ears of corn will be received thereupon as they are driven therepast by the conveyor C. In actual usage, within an operative plant, a plurality of these devices 20 would be arranged along the conveyor belt C and plows or distributor bars would be placed on the conveyor belt C to substantially divide the ears or articles as they are propelled by the conveyor such that a substantial division of the ears being carried is obtained. Power is provided to the pulley 33 through a drive belt 34a, again receiving power from either the main drive motor 27 or the gear reducer 27a. A first guide bar or fence 34 is arranged in substantially overlying relation to the periphery of the disc 30 such that the ears received thereon will be driven therearound by the disc rather than falling off the edge thereof. This guiding fence 34 may extend substantially around the disc 30 leaving only an opening for the ears to be propelled onto the first conveyor element 24.

Figure 8:
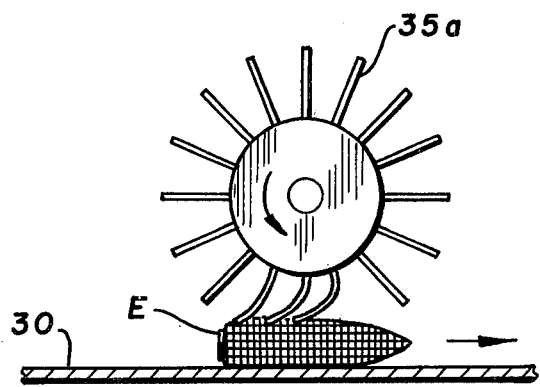
FIG. 8 is a section taken substantially along Line 8—8 of FIG. 7.

As illustrated in the various views, a pair of control and article drive elements designated respectively 35, 36 are arranged in overlying relationship to the disc 30 and each of these drive elements is provided with a paddle wheel device such as illustrated in FIG. 8 and designated respectively, 35a, 36a, with each such paddle wheel consisting of a plurality of flexible arm members which will brush against the ear delivered thereto and will drive the same without damaging the surface of the ear.

The first of such driving paddle wheel elements 35 and 35a is positioned as best illustrated in FIG. 7 at an angle to the plane of the disc 30 but in a manner such that the rotation of the paddle wheel 35a will aid in driving the ear E in substantial conformity with rotation of the disc 30 and adjacent to the guide fence 34. As stated, this guide fence 34 has a gap therein to permit introduction of the ears onto the first conveyor element 24.

In instances, several ears will accumulate at this entrance or discharge area. The second paddle wheel driving device 36, 36a is positioned with respect to this entrance to normally propel ears away from the same such that if two ears should reach the entrance at the same time, the second paddle wheel 36a will drive the inner ear away from the discharge area and will propel the same along the second portion of the guide rail or guide fence 34 and the same will rotate again along with disc 30 to be in position for delivery to the input or first delivery conveyor element 24 on the next rotation of the disc.

The arrangement of the disc 30 as illustrated, and the paddle wheel members along with the guide fence 34 is to insure that ears or articles will be driven singularly and end to end onto the first input conveyor section 24.

It should be noted that the speed of the introductory drive or paddle wheel member 35a may be controlled to properly space the ears as they are delivered to the input or first delivery conveyor 24. It should also be considered that various guide bars may be placed in overlying relationship to the disc 30 inwardly of fence 34 to assist in guiding the ears, but the primary consideration is the extraction of the ears from the conveyor belt C and the controlled delivery of the ears onto the conveyor 24 and this is controlled, of course, by the paddle wheel structure.

Figure 12:
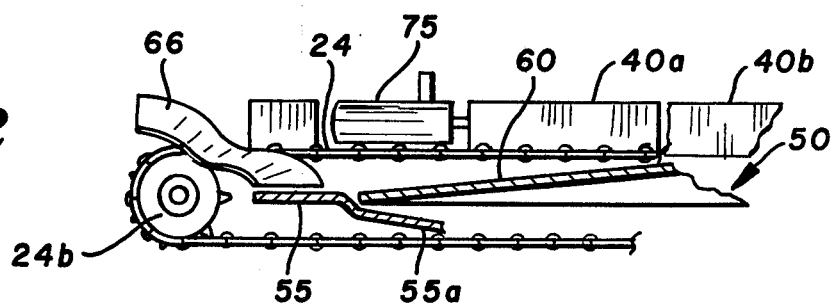
FIG. 12 is a vertical section taken substantially along Line 12—12 of FIG. 6.

The input or first delivery conveyor element 24 is a simple conveyor unit having sprocket means on the ends thereof, the tail sprocket 24b being illustrated in FIG. 12, the front sprocket not being shown but obviously being in position to arrange the receiving end of the conveyor 24 in close proximity and in an underlying relationship to the exit area from disc 30. The conveyor 24 is obviously a continuous run conveyor having an upper and a lower flight with means for driving at least one of the sprockets and preferably the tail sprocket 24b to carry the ears of corn to the orientation section 22. Guide bars 40a, 40b are provided along the upper flight of this conveyor 24 to prevent the ears or articles from falling therefrom. The applicants have found that, although any particular type of conveyor chain is sufficient to propel and carry the ears from to input disc 30 to the orientation section 22 and ultimately from section 22 to the delivery area as provided on conveyor 25, a preferred form of conveyor or continuous chain linkage in combination with the driving sprockets is found through the use of plastic chain and sprockets. The utilization of plastic eliminates rust and cleaning problems and decreases the noise factor in operation of the machines.

The orientation section 22 may actually be divided into two separate elements. The first such element would be the detection structure and actuator 45 and the rotating mechanism 46. The rotating section 46 will be discussed at this time.

Figure 14:
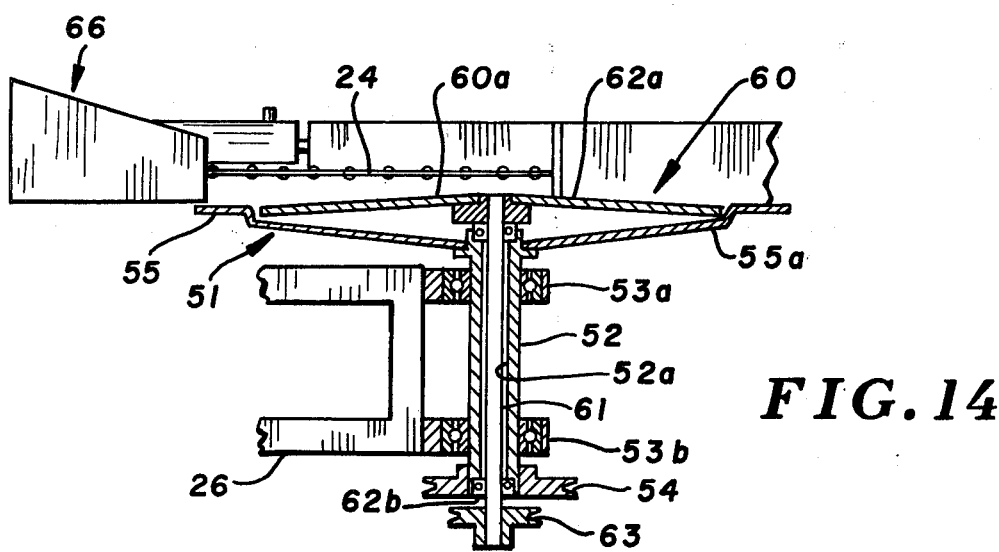
FIG. 14 is a vertical section taken substantially along Line 14—14 of FIG. 6.

As illustrated in the various top views, the rotation section 46 includes a wheel structure 50 mounted for rotation and underlying the upper run of the first conveyor element 24. The particular wheel structure and the intricacies thereof are best illustrated in FIG. 14. As illustrated therein, a dual wheel system including a lower and outer wheel 51 is provided and this wheel is mounted on a drive shaft 52 which extends through a pair of bearing members 53a, 53b and which is driven by a first pulley 54. As illustrated in FIG. 14, this first pulley is of a first predetermined size and this pulley receives power through a drive belt 54a driven by the gear reducer 27a. Obviously, bearings 53a, 53b must be secured to the frame or at least some portion thereof.

The shape of this outer wheel 51 provides generally horizontal exterior flange 55 which is secured to the shaft 52 through either a solid angularly upwardly shaped disc 55a or a plurality of arms that are formed upwardly in the same manner such as to provide a dish shaped area in which an inner wheel or disc 60 may be positioned for rotation. This inner disc 60 is attached to a second shaft 61 which extends through a passage 52a in the first mentioned shaft 52 and is rotatably mounted therein through bearing members 62a, 62b and which shaft 61 is provided with a second pulley or sprocket 63 at the lower extremity thereof and which sprocket 63 is driven by a drive belt 64 again driven from the output of the gear reducer 27a. The shape of the disc 60 may take particular configuration at the lower extremity thereof, but it should be noted, as illustrated in FIG. 14, that the periphery thereof rides in the dish-shaped portion of the outer wheel 51 and the upper surface of such disc 60 is either conically or smoothly curved upwardly such that the centermost portion 60a of this disc 60 is elevated with respect to the outer edge thereof and with respect to the flange 55 of the first mentioned disc 51.

It should be obvious that with this construction and with the two different sized pulleys 54, 63 driven by pulleys of equal size on the gear reducer 27a, that the interior or conical disc 60 will be driven at a greater speed than the outer or lower disc 51. The applicants have found that the differential speed between these two discs is preferrably in the range of from two to one to four to one and the most effective operations and positive turning of ears subjected to the forces provided by these discs is in the range of three to one. It should be obvious that the position of the discs 51, 60 must be maintained with respect to one another such that there is no great loss of continuity in the inner periphery of the outer disc and the outer periphery of the inner disc and that the gap therebetween is relatively small.

An exterior guide or fence 65 of a particular shape is formed about the periphery of the rotating discs 51, 60 and along a select portion thereof an outwardly and upwardly directed plate or ramp element 66 is formed and a generally vertical guide 67 surrounds the remainder of the rotative discs and continues thereon along the exterior side of the delivery conveyor 25 at which point it is designated 68. An inner vertical fence or guide 69 overlies the rotative disc structure and, as illustrated, this fence 69 provides a curved section overlying the wheel or disc structure 51, 60 and continues on the interior of the conveyor 25 at which point it is designated 70.

Figure 13:
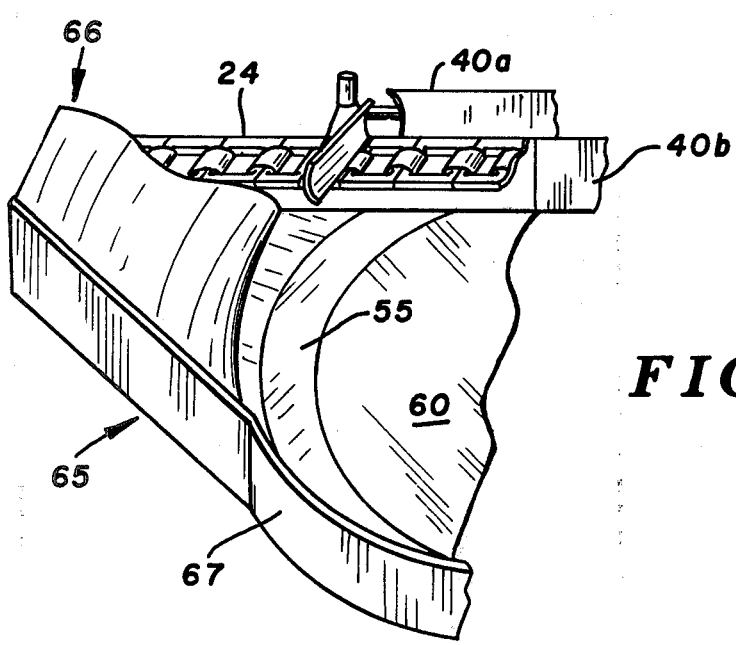
FIG. 13 is a perspective view of the section of the rotation wheel of applicants' invention as best designated by the section along Line 13—13 of FIG. 6.

The ramping structure 66 of the guiding fence element 65 is arranged adjacent to the conveyor 24 and extends arcuately along the rotative disc structure 50 a predetermined dimension. As illustrated, particularly in the perspective of FIG. 13, this ramp provides a smoothly curved and arcuately shaped receiving area upon which ears of corn may slide upwardly and thereafter will slide downwardly onto the rotative disc 51, 60 structure and this is a basic concept of applicants' rotative control for the ears or articles that are received and which must be rotated into their proper end to end position. If an ear leaving the input conveyor 24 is allowed to be directed upwardly onto the ramp 66, one end of the same will slide thereup and the other end will therefore be reversed as the rotating discs contact this end as it descends from the ramp. An additional kicking element is employed and a directive element is employed as will be discussed hereinafter, but utilizing this basic concept, it should be obvious that an ear of corn directed to have one end ride up onto the ramp will be reversed when it slides down the ramp and is frictionally contacted and turned by the rotative disc structure. It is for this reason that the rotative disc structure is driven at its two differential speeds and why the inner disc driven at a faster speed and being upwardly tapered will further assist in the turning of the ear. Obviously, if the butt end of an ear of corn should ride upwardly of the ramp and the smaller end thereof is displaced against the wheel combination, it will obviously contact the upper tapered portion and the more rapidly upper tapered portion will serve to assist in shifting the smaller end of the ear as the large or butt end remains on or moves downwardly on the ramp. The continued rotation of the discs will then, since the inner disc is again tapered, shift the ear of corn or article to the slower moving disc outwardly against the fence 67 where it will be delivered to the output conveyor 25 and selectively to a kernel remover K.

The output or second conveyor 25 is provided with sprockets 25b and 25c and the conveyor provides an upper and lower run of continuous dimension to carry the ears from the disc structure 50 and between the aforementioned guiding elements 68, 70.

Means for directing the ears either directly onto the disc structure or onto the ramp includes what may be termed a kicker element 75 which is in alignment with and overlying the upper run of the first conveyor 24. This kicker element 75 is capable of several movements and these will be discussed in combination with the control section. The kicker element 75 will direct ears that are properly oriented directly onto the disc and will not permit them to enter the ramp area. A second position for this kicker element is to allow complete bypass of an ear and allow the ear to eject along the continuing first conveyor 24. This would happen if a cob were without predetermined limits, were damaged or for any other reason it did not pass certain requirements. A third arrangement would be for the kicker 75 to come into alignment with the edge of the ramp 66 and allow and guide the ear onto the ramp and would, after the ear has partially passed the kicker, kick forwardly and shift the end of the ear outwardly onto the discs to provide an additional turning effect and actually kick the proper end of the ear and insure the turning thereof in combination with the rotating disc structure.

The structure to control the kicker device 75 is best illustrated in FIGS. 6, 15, 16 and 17 and as noted therein, this kicker 75 includes a second leg secured thereto and designated 75a and this combination is pivoted about a pivot point 76 with the end of leg 75a pivotally connected to a piston rod 77 extending from a control piston combination 78. This piston combination 78 is a four port, three way cylinder combination and the other piston rod 79 of this combination is anchored to the frame by a pivotal connection and arm 80. This piston combination, then, is basically free floating between the anchor point 80 and the pivot member 76. The ports of the piston are designated respectively A, B, C, D, and as illustrated, ports A and B will control the movement of piston shaft 77 while ports C and D control the movement of the entire cylinder combination 78 as the piston rod 79 within this portion of the unit has a solid anchoring point at 80. Prior to a description of the actual operation of this cylinder combination, a description of the detector and actuator section 45 should be made as follows.

Figure 9:
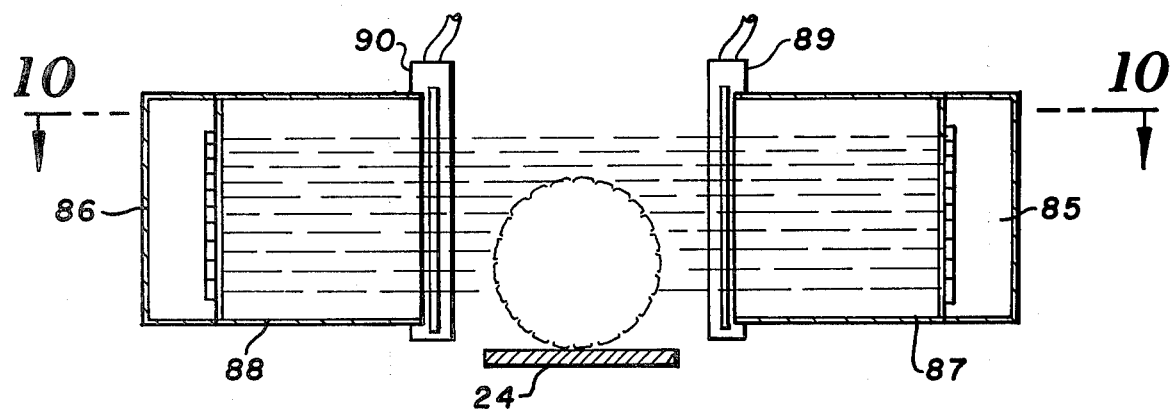
FIG. 9 is a schematic illustration of the section taken substantially along Line 9—9 of FIG. 6.
Figure 10:
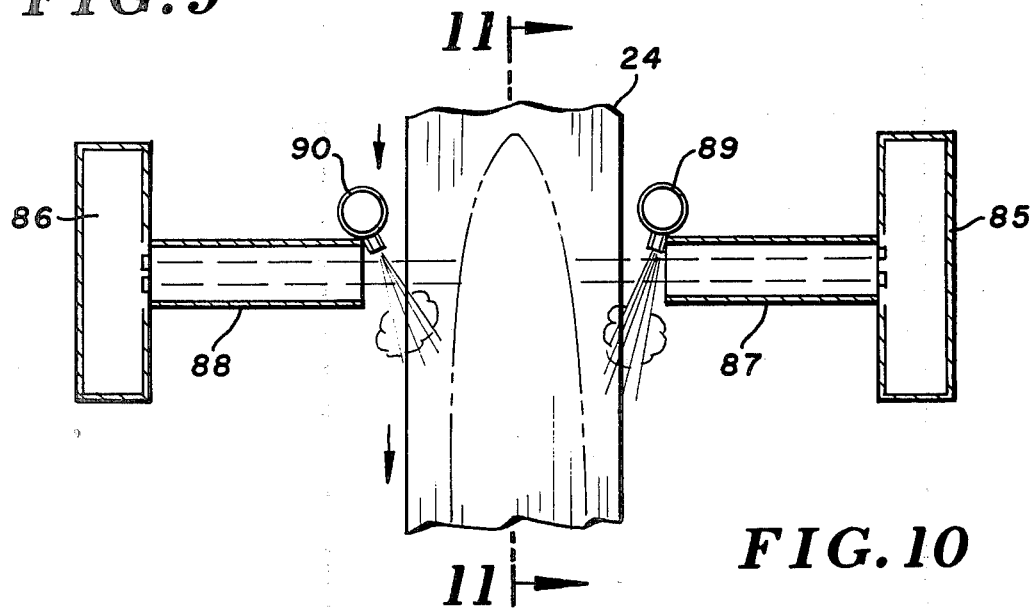
FIG. 10 is a schematic illustration of the structure of FIG. 9, taken substantially along Line 10—10 thereof.
Figure 11:
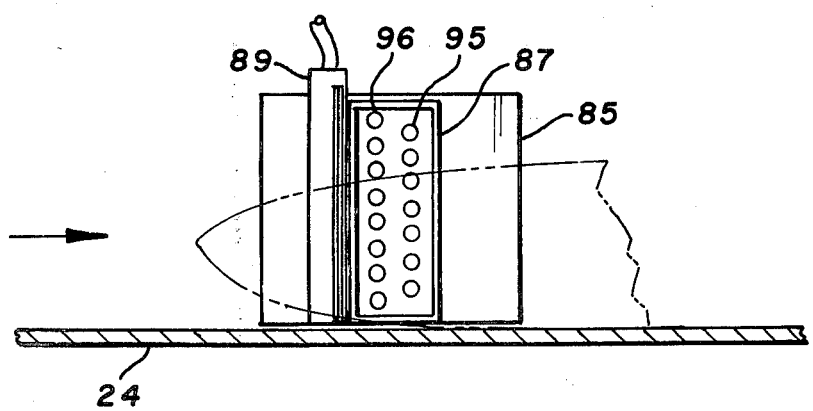
FIG. 11 is a schematic illustration of the structure of FIG. 10, taken substantially along Line 11—11 thereof.

It should be obvious that the detection of ears that are turned the wrong way on the conveyor could be manually performed and similarly, a guiding mechanism could be provided for manual operation to determine whether or not the ear is too long or too short or otherwise undesirable to be properly processed by the following units and by the device itself, but the applicants have chosen to provide a means for automatic detection of at least the length and diameter and the determination of the end of the unit which forwardly disposed. This particular structure is schematically illustrated in FIGS. 9, 10 and 11 and is illustrated in its functioning position which is adjacent to the ears being delivered on the first conveyor 24. In the form shown, an electric eye unit having a sending device 85 is provided on one side of the conveyor and the receiving unit 86 is provided on the other side thereof and a pair of beam guards 87, 88 are arranged around the beam of light to be transmitted and received such that the sender and receiver units 85, 86 may be slightly displaced from the first conveyor 24 but that the beam will be guarded into close proximity to the first conveyor 24 and the ear or articles being carried thereon. Arranged adjacent the apertures of guards 87, 88 are a pair of manifolds 89, 90 which are designed to blow air across the front of the beam guards to prevent any accumulation of foreign material which would block the passage of light between the sender 85 and the receiver 86. Obviously, means must be supplied in the unit for generating this air supply or it could be furnished through independent means.

As illustrated in FIG. 11, the sending unit and likewise the receiving unit, consist of a plurality of lamps and similarly arranged receiver units and these lamps are so situated and the receiver units are so situated that the entire vertical height of the ear passing thereby may be interpreted. For this reason, in the form shown, two such rows of lamps 95, 96 are provided and a plurality of lamps are arranged in vertical relationship in each of said rows such that there will be a continuous vertical height readable due to the breaking of the light beams as the ear passes thereby. It is in this manner that the particular dimension of an ear of corn may be determined and, as those who are acquainted in the art know, an ear of corn is normally provided with a smaller top end and a larger butt end, and even though the butt end may be slightly tapered from the actual center or largest diameter of the ear, the rate of dimensional change is not as drastic as at the forward or top end of the cob. As the ear of corn then passes the sending and receiving unit, by having a readout for each light cell of a small time dimension, a scanning effect takes place as the ear passes and many such readings will determine the rate of change in diameter and therefore will provide a signal to a valving control mechanism for the introduction of fluid into the hydraulic system as illustrated in FIGS. 15, 16 and 17.

As previously stated, the functions of the cylstructure 78 are to provide a means for ejecting ears, turning ears and allowing the ears to continue in their provided direction.

Figure 17:
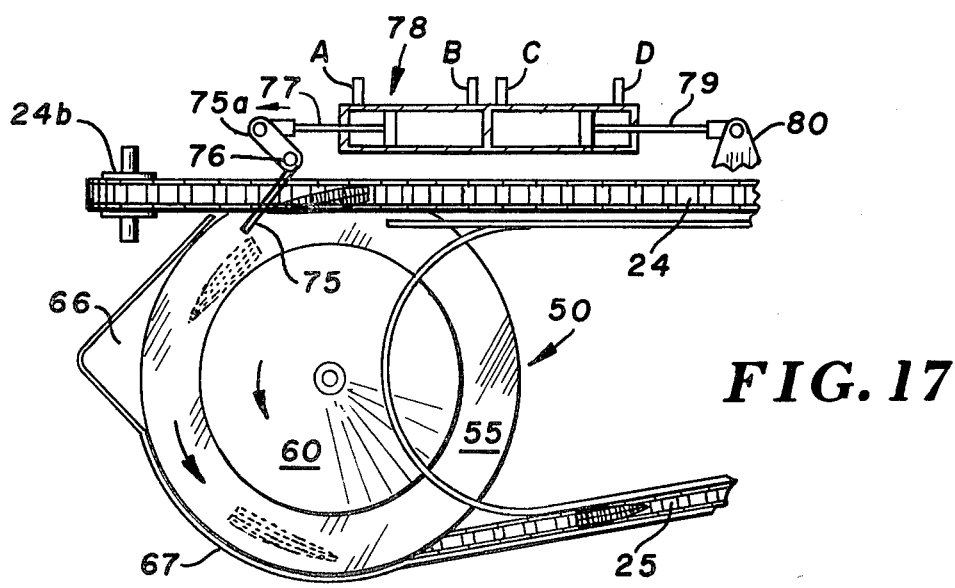

The normal position of the kicker arm 75 is illustrated in FIG. 17 and in this position, ports B and C of the cylinder structure are pressurized. In this position, the ears are directed onto the disc structure with no turning forces being applied thereto. The unit is designed and constructed to assume this normal position after any and all movements of the kicker arm 75 and therefore, after any such movements, ports B and C are pressurized.

Figure 15:
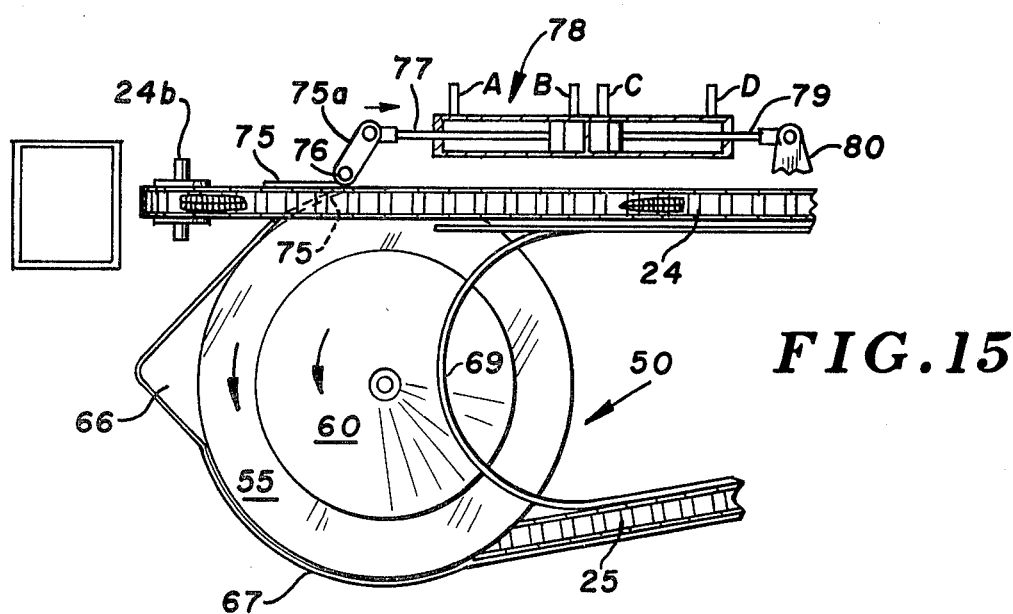
FIG. 15 is a schematic top plan view of the selector and rotation end of the device and illustrating the ear ejector mode of operation of the device.
Figure 16:
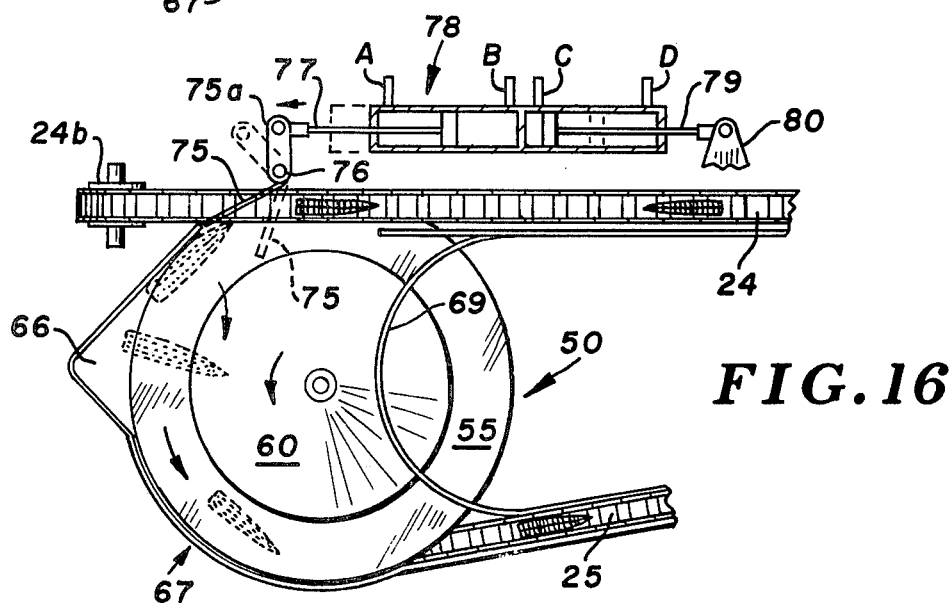
FIG. 16 is a view similar to FIG. 15 and illustrating the turn around mode of operation of the device; and, FIG. 17 is a view similar to FIG. 15 and illustrating the no turn mode of operation of the device.

The ejection position is illustrated in FIG. 15. The ejection condition exists if, for example, the length of the ear passing the sensors is over a predetermined maximum or under a predetermined minimum and there are other conditions under which such ejection would be desired such as the length of stalk attached to the butt of the ear. Under these conditions, the control medium would be directed to ports A & D and this would cause retraction of the kicker arm 75 into parallel relation to the track 24 thus allowing the ear to be directed onwardly by the conveyor and thus to eject the same.

Should the next ear require rotation, this situation is illustrated in FIG. 16. In this view, the normal position of the kicker 75 is illustrated in dotted lines and should rotation be required, ports A & C are pressurized to bring the kicker arm 75 to the solid line position of FIG. 16 to allow the ear to pass onto the ramp area 66. After a selected length of the ear has passed by the kicker arm 75, the pressure is applied to ports B & C to return the kicker to its normal position. This return provides a force to the last portion of the ear to aid in rotation on the same. The kicker arm 75 then aids in the rotation of the ear through this return to normal movement.

Although the applicants have illustrated the cylinder structure as being orientated to hydraulics, it should be understood that any pressurizing medium may be used for the operation of the same.

The operation of the unit would appear to be completely explained through the description of the various elements to this point. The important aspects of the invention should be obvious to anyone skilled in the art in that, at no time, is the article to be handled, dropped or rolled for any measurable distance and this ease of handling will obviously prevent damage to the article being handled.

Although the applicants have illustrated and discussed their unit in the processing of ears of corn, it should be obvious that this device is applicable to the handling of any article that has a variation in its dimension from end to end and which will, therefore, require a rotative effect for proper directional movement of the same.

What we claim is:

1. A device for orienting tapered articles to a desired end to end relation, the articles being delivered to the device in a random fashion, said device including:
   a. a first delivery section arranged to receive the articles in a random fashion and deliver the same in aligned, single file relation;
   b. an orientation section including detection and rotating structures arranged to receive the articles from said first delivery means and selectively turn certain ones thereof whereby all of the articles are arranged in the same end to end relation;
   c. a second delivery section arranged to receive the oriented articles from said orientation section for delivery;
   d. said orientation section including;
   1. at least one, generally horizontal, rotating wheel member positioned to receive articles from said first delivery section and deliver the same to said second delivery section;
   2. a ramp element arranged adjacent said wheel arranged to extend generally radially outwardly from and angularly upwardly from said wheel member and being generally aligned with the aligned flow of articles from said first delivery section;
   3. a shiftable, article positioning, kicker element arranged generally adjacent said first delivery section, normally positioned to direct the articles onto said rotating wheel for unshifted delivery to said second delivery section and being shiftable from said normal directing position to at least a second position to direct one end of the articles onto said ramp element, the other end of the article being delivered to said rotating wheel whereby the rotating movement of said wheel moves the other end of the article forwardly of the one end of the article for delivery of the same to said second delivery section in shifted, reversed position; and,
   4. said detection structure arranged adjacent said first delivery section, sensing the end to end orientation of the articles being delivered therepast and arranged to control the position of said kicker.

2. The structure set forth in claim 1 and said kicker element being shiftable to at least a third position to permit the article to be conveyed by said first delivery section and eject the article from said device.

3. The structure set forth in claim 2 and said detection structure including a plurality of photo-electric cell means arranged and positioned adjacent said first delivery section to sense the variations in the diameter of the article as the same is driven therepast to actuate and position said kicker element in response thereto.

4. The structure set forth in claim 3 and said photo-electric cell means including a source of light and a receiver therefore, and air flow means arranged and positioned with respect to said source and receiver to blow therepast whereby the same are maintained in light conducting and receiving condition.

5. The structure set forth in claim 1 and said orientation section including at least a pair of concentrically arranged wheel members, a first of said wheels being of a first diameter, the second of said wheels being of a second, larger diameter, the first of said wheels being driven at a speed greater than the second of said wheels.

6. The structure set forth in claim 5 and said outer wheel providing a generally flat rim surface adjacent to outer edge of said inner wheel, said inner wheel being generally upwardly conical in shape.

7. The structure set forth in claim 6 and the speed of said first wheel member being three times as great as said second wheel.

8. The structure in claim 1 and said first delivery section including:
   a. generally horizontally disposed disc means;
   b. means for rotatably driving said disc; and,
   c. fence means surrounding at least a selected portion of said disc and providing a discharge area therethrough for the delivery of articles singularly and in end to end fashion to said orientation section.

9. The structure set forth in claim 8 and a first article directing and control paddle wheel member having drive means and arranged in generally overlying relation to said disc means and aligned with said discharge area through said fence, said paddle wheel engaging the periphery of the article and directing the same through said discharge area.

10. The structure set forth in claim 9 and said paddle wheel including a plurality of flexible, radially extending arm members whereby the articles may be driven selectively driven through said discharge area.

11. The structure set forth in claim 10 and a second article directing and control paddle wheel arranged in overlying relation to said disc means and arranged to drive articles generally transversely from said discharge area, whereby a single article will be driven through said discharge area by said first article directing paddle wheel.

* * * * *